ial Office

2,897,243
Patented July 28, 1959

2,897,243

PREPARATION OF PURE MYRISTIC ALCOHOL

Michel Roussos and Yves Bourgeois, Bezons, France, assignors to Société Anonyme dite: Société des Produits Chimiques de Bezons, Bezons, France No Drawing. Application May 20, 1958
Serial No. 736,462

Claims priority, application France May 28, 1957

2 Claims. (Cl. 260—638)

This invention relates to methods of preparing pure n-tetradecanol or myristic alcohol from residual products derived from alkaline cracking of castor oil. N-tetradecanol, otherwise called myristic alcohol, is a 14-carbon aliphatic alcohol possessing valuable commercial properties. The compound is especially used in the preparation of germicides, emulsifiers, detergent and cosmetic compositions.

A conventional process of preparing sebacic acid, a commercial product having a wide range of uses and manufactured in large quantities involves splitting or cracking castor oil at high temperature in the presence of concentrated caustic alkali solutions. During the alkaline splitting reaction, the 18-carbon chain of the ricinoleic acid contained in a concentration of about 85% in the castor oil splits into two segments respectively containing 10 and 8 carbon atoms, and hydrogen gas is evolved. The 10-carbon fraction comprises sebacic acid while the 8-carbon fraction essentially comprises octanol-2 and octanone-2.

In the alkaline splitting of castor oil the octyl derivatives are readily separable by entrainment with water vapour. The splitting process can be carried out at ordinary pressures or at a limited pressure with a continuous distillation of the octanol-2 and octanone-2 together with part of the water supplied in the alkaline lye. Alternatively the reaction may be conducted in a sealed reactor with a final distillation of the octyl products and part of the water, while the hydrogen evolved in the reaction is allowed to expand.

The octanol-2 and octanone-2 in pure form can easily be separated in pure form by known rectification-distillation techniques. At the end of the distillation process there remains a residue comprising fatty compounds representing about 2 to 3% of the initial castor oil used. This residue is believed to result from the non ricinoleic fractions of the initial castor oil which failed to split into sebacic acid and octyl compounds.

This fatty residue, which may for convenience be described as a mixture of crude sebacic aliphatic alcohols, is a complex mixture and while its precise composition is not known, the hydroxyl index, saponification index, and iodine index thereof can be readily determined. When it is attempted to resolve the mixture into its constituents by distillation in vacuo, various ill-defined fractions are obtained with rather poor yields, partial de-composition ensues and tarry compounds form. In practice, such mixtures of crude sebacic fatty alcohols have heretofore been regarded as commercially valueless by-products.

We have now made the surprising discovery that by a relatively simple procedure to be described, such crude sebacic fatty alcohols can be converted into valuable compounds having definite chemical composition. The process essentially involves treating the mixtures with superheated steam in a temperature range of about 150°–250° C. in the presence of an amount of caustic alkali not less than that corresponding to the saponification index of the mixture being treated. Fatty alcohols are thus produced which are separable by distillation into pure constituents. The end products comprise a small quantity of octanol-2, while at least 80% of the resulting mixture comprise pure n-tetradecanol or myristic alcohol, and about 10% oleic alcohol.

The result just described is unexpected for several reasons. First, the desirability of performing a further alkaline saponification step was hardly to be predicted since the starting materials themselves originated in the highly alkaline medium present in the sebacic splitting reaction. Then, the fact that the bulk of the reaction product is myristic alcohol was totally unexpected, since no 14-carbon aliphatic chains were ever before recognized as being present in the composition of castor oil.

As already mentioned, pure myristic alcohol has considerable commercial value since it is used in the manufacture of highly surface-active fatty alcohol sulfates, in the preparation of quaternary ammonium salts having germicidal properties, non-ionic emulsifiers and detergents, cosmetics and other commodities. An interesting point is that, within the whole series of surface-active agents derivable from aliphatic chains, the optimum average properties are found to be achieved where the chain includes 14 carbon atoms.

Oleic alcohol which is a by-product of the process is likewise valuable in the manufacture of sulfonates and non ionic derivatives.

Some examples will now be described as illustrations of the invention. Parts by weight and parts by volume are related as grams to cubic centimeters.

Example 1

*1st step.*—Octanol-2 and octanone-2 are first prepared by the following conventional process.

An oblong stainless steel-lined autoclave is used to perform a continuous alkaline splitting of castor oil, by pumping into the bottom of the autoclave 100 parts castor oil per 150 parts soda lye at a concentration of 40% by weight. The autoclave is heated to 300° C. and the reaction mixture is withdrawn from the top of the autoclave and allowed to expand. The gaseous phase resulting from the expansion is passed into a cooler and condenses into a lighter organic phase and a heavier phase essentially containing water.

The supernatent organic phase is dried and distilled. A mixture is obtained comprising octanol-2 and octanone-2 boiling at 172–178° C. at atmospheric pressure. The octanone passes as a head fraction and pure octanol-2 is collected at 177–178° C. The heavy remaining residual fractions are waxlike, brown, and represent about 2 to 3% of the initial castor oil. The residual mixture is found to have the following characteristics:

Saponification index _____ 66
Hydroxyl index _____ 169
Iodine index _____ 30

*2nd step.*—The waxlike residual mixture which comprises the "crude sebacic fatty alcohol" mixture mentioned previously, is now distilled in a vacuum of about 17 mm. Hg. In the temperature range from 85 to 195° C. no definite fraction is found to distill. In the 85 to 125° C. range a fraction is obtained having a saponification index 6 and comprising impure octanol 2. Subsequent fractions obtained at increasing distillation temperatures are found to possess the following saponification indices: 125–160° C., S.I. 28; 160–180° C., S.I. 10; and 180–195° C., S.I. 70. A dark residue remains which breaks down rapidly and has a saponification index of 131. This residue represents about 40% of the crude sebacic fatty alcohols initially present.

It is noted that in the step just described which is a conventional fractional distillation, none of the fractions produced is a pure alcohol.

*Example 2*

The crude sebacic fatty alcohol mixture obtained as at the end of the first step in Example 1, is treated in in accordance with the invention. For this purpose the mixture is placed in a steel, oil-fired boiler provided with a dipper pipe connected with a source of superheated steam at 3 kg./sq. cm. pressure (about 110° C.) and provided with an agitator. The boiler is connected to a condenser provided with cold water circulation. A quantity of soda lye at a concentration of 30% by weight is added, corresponding to the saponification index of the mixture plus an excess of about 10%. The mixture is then heated to 220° C. with agitation and steam is delivered through the dipper pipe. Mixed water and fatty alcohol vapours evolve which condense, and the organic fraction is separated from the heavier water fraction.

The gradual entrainment of the fatty alcohols serves in itself as a kind of rectifying operation. Thus the vapours discharged into the condenser are initially charged essentially with octanol-2, and the temperature in the condenser is at that time about 130° C. As the condenser temperature rises above 170° C., the condensate partly sets and now contains heavy fatty alcohols. The entrainment is continued until a point where the condensed water no longer carries any alcohol with it. At this time the temperature in the vapour is about 210° C. The boiler contains a residue of soda soap. This results from the sodic fraction of the esters present in the initial sebacic fatty alcohol mixture and represents about 25% of the starting material introduced.

The alcohols entrained by the steam represent about 75% by weight of the initial content. Their sponification index is zero and they are separated by fractional distillation, first at ordinary pressure then in vacuo. Three distinctly separate ranges of distillation are observed:

177–178° C. at ordinary pressure, corresponding to octanol-2.
166–168° C. at 15 mm. Hg, corresponding to n-tetradecanol.
185–187° C. at 15 mm. Hg, corresponding to oleic acid.

The n-tetradecanol obtained by this process represents 55% of the crude sebacic fatty alcohols introduced, and 80% of the purified alcohols recovered. Its characteristics are as follows:

Acid index _____ 0 (0 theoretical)
Saponification index _____ 0 (0 theoretical)
Hydroxyl index _____ 259 (261 theoretical)
Freezing point _____ 37–38° C. (38° C. theoretical)

Its melting point is not altered when mixed with a batch of control myristic alcohol, and it has the same analytic distillation curve, whether alone or in admixture with the control.

What we claim is:

1. The method of preparing pure myristic alcohol, comprising, alkali-splitting castor oil, distilling the octanol-2 and octanone-2 from the residue of the alkali-splitting reaction, entraining the residue stripped of octanol-2 and octanone-2 with superheated steam at about 150 to 250° C. in the presence of alkali lye in an amount not less than that corresponding to the saponification index of said residue, and recovering pure myristic alcohol from the distillation condensate.

2. The method claimed in claim 1, wherein the entrainment is performed fractionally, so as to yield separate fractions comprising pure octanol-2, pure myristic alcohol and pure oleic alcohol.

References Cited in the file of this patent

Handbook of Chemical Rubber Publishing Co., 36th ed. (1954–5), pp. 1168–9.